United States Patent [19]

Nolan et al.

[11] Patent Number: 4,763,976
[45] Date of Patent: Aug. 16, 1988

[54] CONNECTOR EMPLOYING MODE FIELD MODIFICATION

[75] Inventors: Daniel A. Nolan, Corning; Carlton M. Truesdale, Painted Post, both of N.Y.

[73] Assignee: Corning Glass Works, Corning, N.Y.

[21] Appl. No.: 52,281

[22] Filed: May 21, 1987

[51] Int. Cl.[4] .............................................. G02B 6/26
[52] U.S. Cl. ................................ 350/96.15; 350/96.20; 350/96.33
[58] Field of Search ............... 350/96.15, 96.20, 96.21, 350/96.29, 96.30, 96.33

[56] References Cited

U.S. PATENT DOCUMENTS

| 3,779,628 | 12/1973 | Kapron et al. | 350/96.15 |
| 4,252,403 | 2/1981 | Salisbury | 350/96.15 |
| 4,415,227 | 11/1983 | Unger | 350/96.15 |
| 4,465,335 | 8/1984 | Eppes | 350/96.21 |
| 4,521,070 | 6/1985 | Sottini et al. | 350/96.15 |
| 4,654,532 | 3/1987 | Hirschfeld | 350/96.15 X |
| 4,678,267 | 7/1987 | Burns et al. | 350/96.15 |
| 4,688,884 | 8/1987 | Scifres et al. | 350/96.15 |

FOREIGN PATENT DOCUMENTS 116850 10/1978 Japan ................................. 350/96.21

Primary Examiner—William L. Sikes
Assistant Examiner—Frank González
Attorney, Agent, or Firm—William J. Simmons, Jr.

[57] ABSTRACT

Disclosed is a mode field modifier for use with an optical fiber having a core and a cladding of outside diameter d. The modifier comprises a modifier core having a refractive index $n_1$. Surrounding the modifier core is first cladding layer having a refractive index $n_2$ that is less $n_1$. On the surface of the first cladding layer is a second cladding layer having a refractive index $n_3$ which is less than $n_2$. The modifier is tapered intermediate its ends whereby it has a large diameter end and a small diameter end. The diameters of at least the core and first cladding layer at the large diameter end are greater than the corresponding diameters at the small end. The diameter $D_1$ of the first cladding layer at the large diameter end is greater than d. An axially disposed hole in the large diameter end receives a fiber which is held in such alignment with the mode field modifier that it is in light coupling relationship with the modifier core. The mode field of a signal coupled from the fiber to the mode modifier expands as it propagates though the tapered portion of the modifier to the small diameter end. An in-line coupler between two optical fibers is effected by connecting together in axial alignment two such mode field modifiers with their small diameter ends adjacent one another.

9 Claims, 3 Drawing Sheets

CONNECTOR EMPLOYING MODE FIELD MODIFICATION

BACKGROUND OF THE INVENTION

This invention relates to optical fiber connectors, and, more particularly, to connectors which are capable of connecting an optical fiber to a source or to another optical fiber with very little sensitivity to lateral misalignment.

Although the present invention finds utility in the coupling of light from a source to an optical fiber, the present discussion concerning connector alignment problems will be limited to fiber-to-fiber connectors. The butt connection between the ends of two fibers will result in an insertion loss that is caused by various optical fiber misalignment parameters. Examples of such misalignment parameters are as follows: (a) lateral misalignment between the axes of the two fibers, (b) longitudinal misalignment between the endfaces of the two fibers, and (c) angular misalignment between the axes of the two fibers.

The usual approach to fiber coupling is the butted end coupler in which fibers which have had their endfaces prepared are brought into angular, lateral and axial alignment. Such alignment is difficult to achieve outside the laboratory. Since the butted fiber arrangement is particularly sensitive to lateral displacement, this type of connector is difficult to use in field applications.

Beam expanders employing lenses or tapered fibers have been employed in in-line single-mode fiber connectors which, due to the small core diameter of such fibers, are extremely sensitive to lateral misalignment. Although such beam expanders exhibit a reduced sensitivity to lateral displacement, they are generally very sensitive to angular misalignment. The art of aligning two connector halves is sufficiently advanced that angular misalignment is not a primary concern. Expanded beam connectors are therefore receiving a considerable amount of attention.

The basic principal of expanded beam connectors is described in the publication K. P. Jedrzejewski et al. "Tapered-Beam Expander for Single-Mode Optical-Fiber Gap Devices", *Electronics Letters*, 16th Jan. 1986, vol. 22, No. 2, pp. 105–106. That publication teaches a connector of the type wherein the end of a single-mode fiber having a core refractive index $n_1$ and a cladding refractive index $n_2$ is inserted into a tube of glass having a refractive index $n_3$ which is lower than $n_2$. The refractive index of the tube is slightly lower than cladding $n_2$. The capillary tube is uniformly heated to collapse it about the fiber. The central region of the combined fiber and capillary is then tapered to a minimum neck diameter of 40 μm, which is appropriate for fiber handling and cleaving. A taper ratio of 4:1 is said to be adequate for minimizing insertion loss. Since the end of the fiber forms the central portion of the connector, no means need be provided for attaching the fiber to the connector half. However, that fiber cannot be easily disconnected from the connector half and replaced by another fiber. Furthermore, by employing the fiber as the internal portion of the connector half, the maximum spot size is limited.

SUMMARY OF THE INVENTION

Briefly, the present invention relates to a mode field modifier for use with an optical fiber having a core and a cladding of outside diameter d. The mode field modifier comprises a modifier core having a refractive index $n_1$ and a first cladding layer surrounding the modifier core. The first cladding layer has a refractive index $n_2$ that is less than $n_1$ and a diameter $D_1$ that is greater than d. On the surface of the first cladding layer is a second cladding layer, the refractive index $n_3$ of which is less than $n_2$. The modifier is tapered intermediate its ends whereby it has a large diameter end and a small diameter end. The diameters of at least the core and the first cladding layer at the large diameter end are greater than the corresponding diameters at the small diameter end, whereby the mode field of an optical signal propagating in one end of said modifier is modified as the signal propagates through the tapered portion of said modifier. Means are provided for positioning a fiber at the large end in light coupling relationship with the modifier core. The mode field diameter can be increased by forming a modifier in which the ratio $(n_2-n_3)/n_2$ has been minimized.

The means for positioning a fiber can be a hole in the large diameter end of the mode field modifier. In one embodiment the first cladding layer consists of inner and outer layers of glass the inner layer being more soluble in a given solvent than the outer layer. The hole is formed by immersing the large diameter end in a solvent to dissolve the inner layer to a sufficient depth. The refractive index of the outer layer can be equal to or less than that of the inner layer.

The fiber can be properly positioned with respect to the modifier by incorporating an end of the fiber in the modifier as the central region thereof. In this embodiment the end of the fiber is surrounded by a tube comprising concentric regions, the refractive index of the outer region being lower than that of the inner region.

The small diameter ends of two such mode field modifiers can be connected end-to-end to effect a low loss connection between fibers attached to the large diameter ends of such modifiers. Such mode field modifiers are especially useful for connecting single-mode fibers.

The present mode field modifier is also useful for connecting an optical fiber to a light source or detector.

DESCRIPTION OF THE PREFERRED EMBODIMENT

Figure 1:
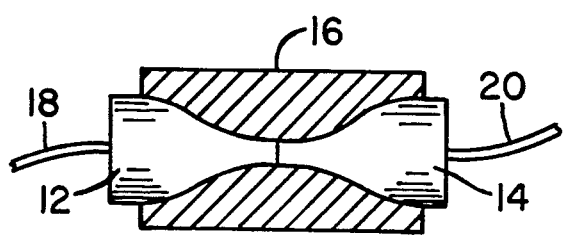
FIG. 1 is a cross-sectional view of an in-line fiber connector employing two mode field modifiers.

FIG. 1 shows an in-line fiber connector of the mode field diameter modification type. Two connector halves 12 and 14 are secured together in axial alignment by sleeve 16. Means to be discussed later are provided for securing fibers 18 and 20 in axial alignment with the large diameter ends of connector halves 12 and 14, respectively. An optical signal propagating in fiber 18 is coupled to the core of connector half 12. As this signal propagates toward the small diameter end of coupler 12 the mode field diameter expands, the expanded beam coupling into the small diameter end of connector half 14. Because of the large size of the beam at the small diameter ends, this type of connector is much less sensitive to lateral misalignment. This type of expanded-beam connector is a rugged alternative to lens beam-expanders in connectors and other in-line fiber devices.

Figure 2:
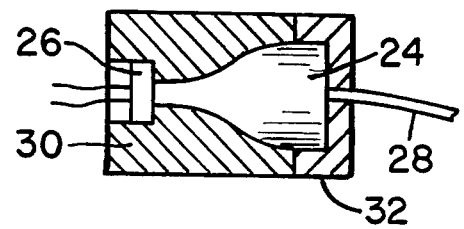
FIG. 2 is a cross-sectional view of a mode field modifier connection between an optical fiber and a light source.

FIG. 2 illustrates that a similar connector half 24 may be employed to connect the output from light emitting diode 26 to fiber 28. Housing 30 contains cavities for receiving the diode and connector half. Means 32 located at the large diameter end of the connector half 24 contains an aperture for receiving fiber 28 in alignment with the core of mode field modifier 24.

Figure 3:
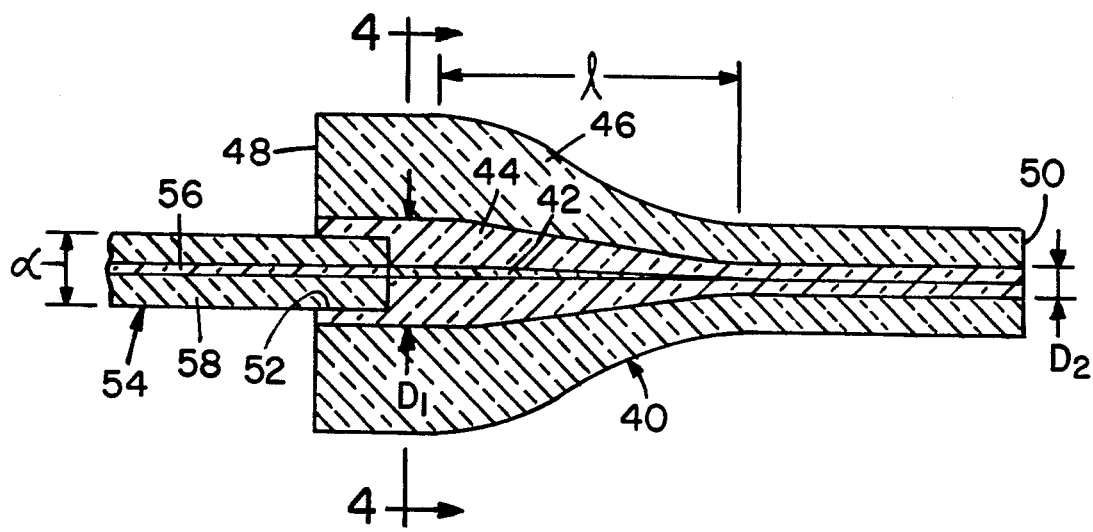
FIG. 3 is a cross-sectional view of the mode field modifier of the present invention.
Figure 4:
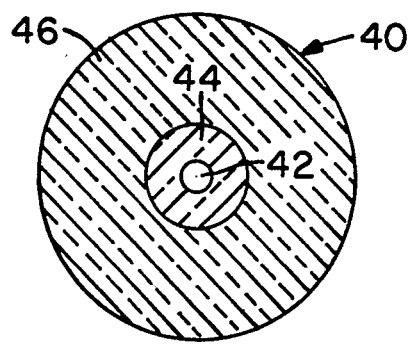
FIG. 4 is a cross-sectional view taken along lines 4—4 of FIG. 3.
Figure 5:
FIG. 5 is the refractive index profile of the large diameter end of the mode field modifier of FIG. 3.

The mode field modifier of the present invention is shown in greater detail in FIGS. 3 and 4, and the refractive index profile of the large diameter end thereof is shown in FIG. 5. Modifier 40 comprises a core 42 of refractive index $n_1$ surrounded by a layer 44 of cladding material having a refractive index $n_2$ which is less than $n_1$. A second cladding layer 46 on the surface of layer 44 has a refractive index $n_3$ which is less than $n_2$. For device 40 to function as a mode field modifier, the diameters of at least the core 42 and first cladding layer 44 must change intermediate ends 48 and 50. In the illustrated embodiment, modifier 40 is tapered intermediate ends 48 and 50 such that the diameter of layer 44 decreases over length l from $D_1$ to $D_2$. A fiber 54 having core 56 and cladding 58 is positioned at the large diameter end of modifier 40 in light coupling relationship therewith. In this embodiment, fiber 54 extends into a hole 52 that is formed in large diameter end 48. Hole 52 is centered about the axis of modifier 40 so that fiber core 56 is aligned with modifier core 42. The difference between $n_1$ and $n_2$ should be similar to the $\Delta$ value of fiber 54. A loss will occur if the diameter of core 42 is not the same as that of core 56.

A single-mode or multimode signal propagating in fiber 54 is coupled to the optical waveguide comprising core 42 and first cladding layer 44. In a multimode system, the term "mode field" refers to the summation of the mode fields of all modes. The tapered region along length l has a significant affect on the propagating optical field. Initially the field is guided by, and substantially confined to core 42. As the core diameter decreases the field spreads out, and spot size increases. Eventually a point is reached when the field is no longer guided by the core but is effectively guided by the waveguide consisting of first cladding 44 and second cladding 46. The small end diameter $D_2$ of layer 44 is greater than the diameter of core 56. Because of the large diameter spot size at end 50 of modifier 40, light can be coupled to the small diameter end of a like modifier as illustrated in FIG. 1. Although this device is useful for the in-line connection of multimode fibers, it is especially useful in single-mode systems wherein the spot size at the endface of the single-mode fiber is extremely small.

Figure 6:
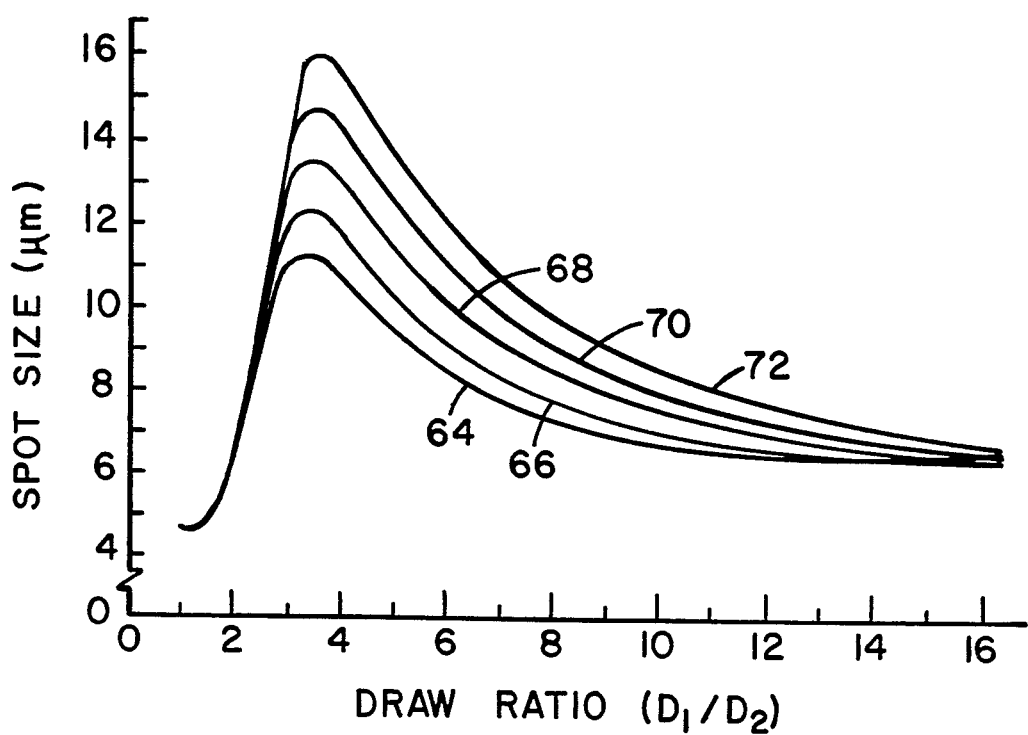
FIG. 6 is a graph of spot size versus draw ratio for different values of cladding diameter $D_1$.

It is the larger spot size at small diameter end 50 which renders the connector of FIG. 1 less sensitive to lateral misalignment. It has been discovered that an even greater enlargement of the spot size can be achieved if the diameter $D_1$ of first cladding layer 44 is greater than diameter d of fiber 54. This relationship is illustrated in the graph of FIG. 6 wherein spot size is plotted as a function of draw ratio for different values of cladding diameter $D_1$. For this experiment fiber 54 was a single-mode fiber having a diameter d of 125 $\mu$m. Curve 64 is the spot size versus draw ratio curve for a modifier having an inner cladding diameter $D_1$ which is also equal to 125 $\mu$m. Curves 66, 68, 70 and 72 illustrate the spot size versus draw ratio relationship which exists when the diameter $D_1$ is equal to 140 $\mu$m, 160 $\mu$m, 180 $\mu$m and 200 $\mu$m, respectively.

Figure 7:
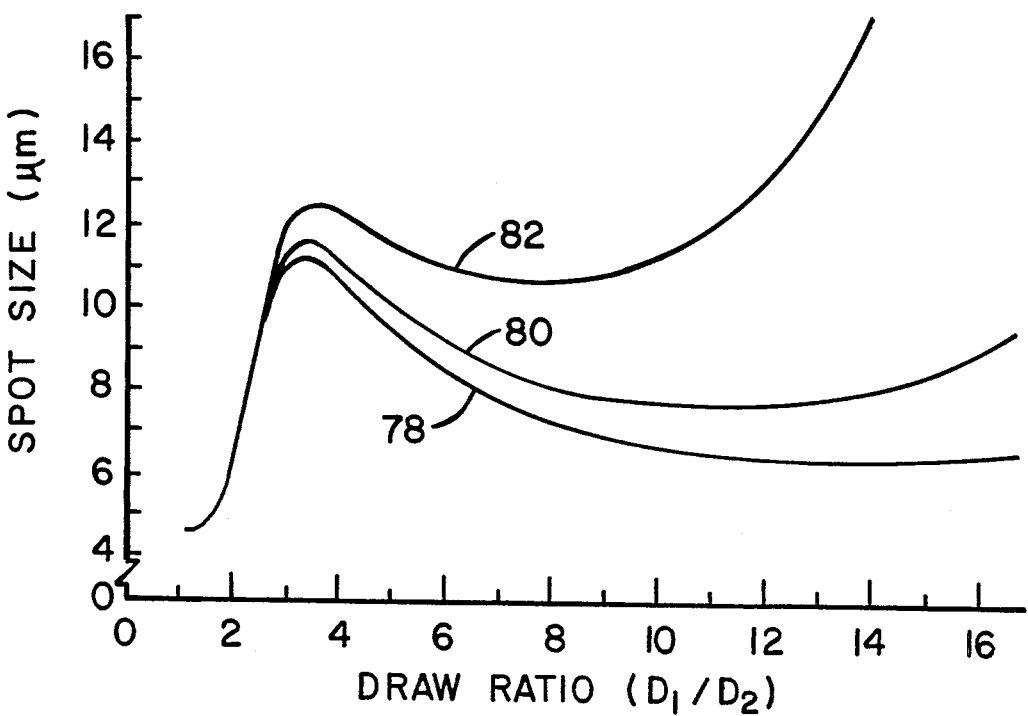
FIG. 7 is a graph of spot size versus draw ratio for different values of percent $\Delta_{2-3}$.

Spot size is related to a lesser degree to % $\Delta_{2-3}$ which is equal to $(n_2-n_3)/n_2 \times 100\%$. The graph of FIG. 7 illustrates the relationship between spot size and draw ratio for different values of % $\Delta_{2-3}$. Curves 78, 80 and 82 were generated from devices wherein the diameter d of single-mode fiber 54 and the diameter $D_1$ of inner cladding layer 44 were 125 $\mu$m. Curve 78, which is identical with curve 64 of FIG. 6, is for a mode field modifier wherein % $\Delta_{2-3}$ is 0.15%. Curves 80 and 82 represent devices wherein % $\Delta_{2-3}$ is equal to 0.10% and 0.05%, respectively. FIG. 7 shows that for draw ratios between 3.5 and 4 an increase in spot size of about 1 $\mu$m can be achieved by reducing % $\Delta_{2-3}$ from 0.15% to 0.05%. If a mode field modifier is to be used in a connector for multimode optical fibers, the $\Delta$-value of the mode field modifier should be on the order of that of the fiber, or higher order modes will be lost. Therefore, a mode field modifier having a % $\Delta$ of 0.05% would be useful for only single-mode fibers.

Figure 8:
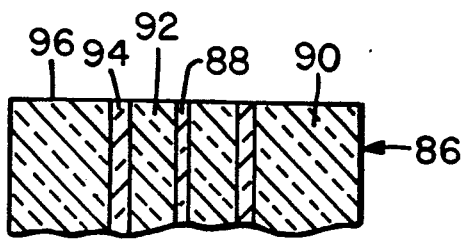
FIGS. 8 and 9 illustrate one embodiment of the invention whereby a fiber alignment hole is formed by dissolving a glass layer.
Figure 9:
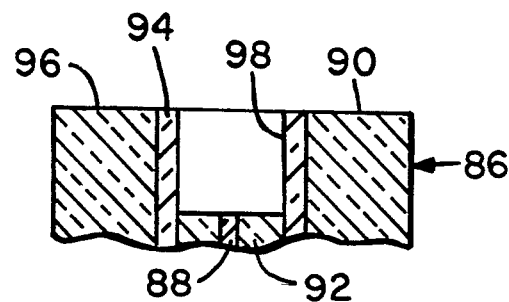

The spot size for curve 82 is about 17 $\mu$m for a draw ratio of about 14. However, since operation in this region of the curve is more susceptible to loss, a draw ratio between about 3.5 and 4.0 may be preferred. It is noted that if the taper rate is sufficiently small, there will be negligible loss due to mode coupling. Thus, it is possible to form very low loss connectors having draw ratios greater than 10:1. By very low loss is ment a loss that is much lower than the 1 dB loss that is usually considered to be tolerable. A method of forming the fiber positioning hole 52 is illustrated in FIGS. 8 and 9. In this embodiment, mode field modifier 86 comprises a core 88 and a second cladding layer 90 having optical characteristics similar to core 42 and second cladding 46 of FIG. 3. The first cladding layer comprises concentric layers 92 and 94, the refractive index of layer 94 being equal to or less than that of layer 92. The compositions of layers 92 and 94 differ, the glass of layer 92 being more soluble in a given solvent than that of layer 94. Cladding 96 must also be resistant to being dissolved in the given solvent. For example, the various glasses which comprise modifier 86 could consist essentially, expressed in weight percent on the oxide basis, of the compositions specified in the following table.

|  | Core 88 | Layer 92 | Layer 94 | Layer 90 |
| --- | --- | --- | --- | --- |
| $SiO_2$ | 30.5 | 27.5 | 60 | 61 |
| $B_2O_3$ | 35 | 38 | — | — |
| $Na_2O$ | 11 | 11 | 14 | 14 |
| BaO | 12.5 | 12.5 | — | — |

-continued

|  | Core 88 | Layer 92 | Layer 94 | Layer 90 |
| --- | --- | --- | --- | --- |
| ZnO | 8.5 | 8.5 | 5 | 5 |
| PbO | — | — | 17.5 | 16.5 |
| $Al_2O_3$ | 2.5 | 2.5 | 3 | 3 |
| $As_2O_3$ | — | — | .5 | .5 |
| Refractive Index | 1.546 | 1.542 | 1.542 | 1.538 |

When end 96 of modifier 86 is immersed in nitric acid, layer 92 is more readily etched so that hole 98 of FIG. 9 is formed.

Figure 10:
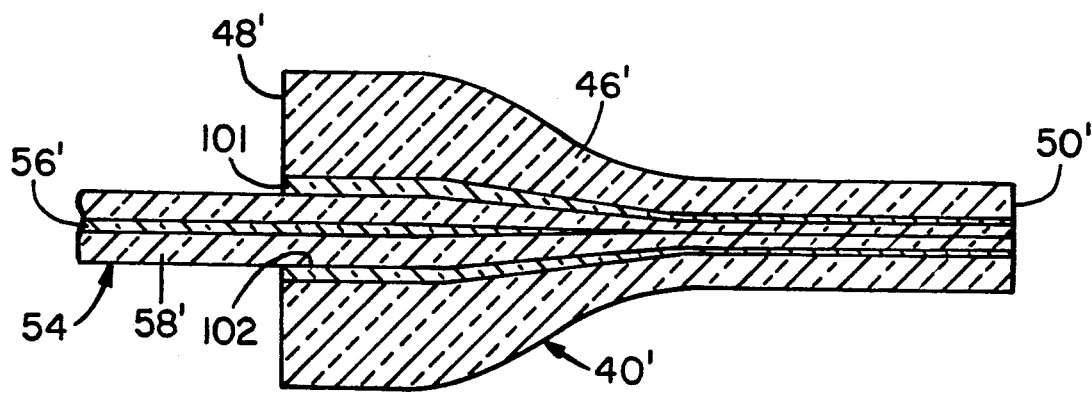
FIG. 10 is a cross-sectional view of a further embodiment.

The mode field modifier could also be fabricated in the manner illustrated in FIG. 10 wherein elements similar to those of FIG. 3 are represented by primed reference numerals. The end of fiber 54' is inserted into an aperture 102 in a tube comprising concentric regions 101 and 46'. The refractive index of region 101 is preferably the same as that of fiber cladding 58' and is greater than that of region 46'. The tube is symmetrically heated to collapse it uniformly about fiber 54'. The combined fiber and tube is then tapered and the small diameter end is cleaved to form mode field modifier 40'.

We claim:

1. A mode field modifier for use with an optical fiber having a core and a cladding of outside diameter d, said modifier comprising
    a modifier core having a refractive index $n_1$,
    a first cladding layer surrounding said modifier core, said first cladding layer having a refractive index $n_2$ that is less than $n_1$,
    a second cladding layer on the surface of said first cladding layer, the refractive index $n_3$ of said second cladding layer being less than $n_2$, said modifier being tapered intermediate its ends whereby it has a large diameter end and a small diameter end, the diameters of at least said core and said first cladding layer at said large diameter end are greater than the corresponding diameters at said small diameter end, whereby the mode field of an optical signal propagating in one end of said modifier is modified as said signal propagates through the tapered portion of said modifier, the diameter $D_1$ of said first cladding layer at said large diameter end being greater than d, and
    means for positioning a fiber at said large diameter end in light coupling relationship with said modifier core, said means for positioning comprising a hole in said large diameter end, said hole being concentric with said modifier core.

2. A mode field modifier in accordance with claim 1 wherein said first cladding layer comprises inner and outer layers of glass, said inner layer being more soluble in a given solvent than said outer layer.

3. A mode field modifier in accordance with claim 2 wherein the refractive index of said outer layer is substantially the same as that of said inner layer.

4. A mode field modifier in accordance with claim 2 wherein the refractive index of said outer layer is less than that of said inner layer.

5. A device for connecting first and second single-mode optical fibers of diameter d, said device comprising
    first and second mode field modifiers, each having a modifier core having a refractive index $n_1$, a first cladding layer surrounding said modifier core, said first cladding layer having a refractive index $n_2$ that is less than $n_1$,
    a second cladding layer on the surface of said first cladding layer, the refractive index $n_3$ of said second cladding layer being less than $n_2$, said modifier being tapered intermediate its ends whereby it has a large diameter end and a small diameter end, the diameters of at least said core and said first cladding layer at said large diameter end are greater than the corresponding diameters at said small diameter end, whereby the mode field of an optical signal propagating in one end of said modifier is modified as said signal propagates through the tapered portion of said modifier, the diameters of said core and first cladding layer at said small diameter end being sufficiently small that the field of a signal propagating in said large diameter end of said coupler toward the small diameter end thereof is no longer confined to said core and first cladding but it spreads and is effectively guided by the waveguide consisting of said first and second claddings, the diameter $D_1$ of said first cladding layer at said large diameter end being greater than d, whereby an enhanced enlargement of the mode field diameter of said single-mode signal is obtained,
    means for positioning said first optical fiber at said large diameter end of said first modifier in light coupling relationship with said first modifier core,
    means for positioning said second optical fiber at said large diameter end of said second modifier in light coupling relationship with said second modifier core, and
    means for positioning the small diameter end of said first modifier adjacent the small diameter end of said second modifier with the axes of said first and second modifiers in substantial alignment.

6. A mode field modifier for use with an optical fiber having a core and a cladding of outside diameter d, said modifier comprising
    a modifier core having a refractive index $n_1$,
    a first cladding layer surrounding said modifier core, said first cladding layer having a refractive index $n_2$ that is less than $n_1$,
    a second cladding layer on the surface of said first cladding layer, the refractive index $n_3$ of said second cladding layer being less than $n_2$, the ratio $(n_2-n_3)/n_2$ being no smaller than 0.5%, said modifier being tapered intermediate its ends whereby it has a large diameter end and a small diameter end, the diameters of at least said core and said first cladding layer at said large diameter end are greater than the corresponding diameters at said small diameter end, whereby the mode field of an optical signal propagating in one end of said modifier is modified as said signal propagates through the tapered portion of said modifier, the diameter $D_1$ of said first cladding layer at said large diameter end being greater than d, and
    means for positioning a fiber at said large diameter end in light coupling relationship with said modifier core.

7. A mode field modifier for use with an optical fiber having a core and a cladding of outside diameter d, said modifier comprising
    a modifier core having a refractive index $n_1$, a first cladding layer surrounding said modifier core, said first cladding layer having a refractive index $n_2$ that is less than $n_1$, a second cladding layer on the surface of said first cladding layer, the refractive index $n_3$ of said second cladding layer being less than $n_2$, said modifier being tapered intermediate its ends whereby it has a large diameter end and a small diameter end, the diameters of at least said core and said first cladding layer at said large diameter end are greater than the corresponding diameters at said small diameter end, whereby the mode field of an optical signal propagating in one end of said modifier is modified as said signal propagates through the tapered portion of said modifier, the diameter $D_1$ of said first cladding layer at said large diameter end being greater than d, and means for positioning a fiber at said large diameter end in light coupling relationship with said modifier core, said fiber forming the central portion of said mode field modifier and said first cladding layer comprising the cladding of said fiber and a further layer on the surface of said fiber cladding, said further layer having a refractive index equal to or less than that of said fiber cladding.

8. A mode field modifier for use with an optical fiber having a core and a cladding of outside diameter d, said modifier comprising a modifier core having a refractive index $n_1$, a first cladding layer surrounding said modifier core, said first cladding layer having a refractive index $n_2$ that is less than $n_1$, a second cladding layer on the surface of said first cladding layer, the refractive index $n_3$ of said second cladding layer being less than $n_2$, said modifier being tapered intermediate its ends whereby it has a large diameter end and a small diameter end, the diameters of at least said core and said first cladding layer at said large diameter end being greater than the corresponding diameters at said small diameter end, the diameters of said core and first cladding layer at said small diameter end being sufficiently small that the field of a signal propagating in said large diameter end of said coupler toward the small diameter end thereof is no longer confined to said core and first cladding but it spreads and is effectively guided by the waveguide consisting of said first and second claddings, the diameter $D_1$ of said first cladding layer at said large diameter end being greater than d, whereby an enhanced enlargement of the mode field diameter of said single-mode signal is obtained, and means for positioning a fiber at said large diameter end in light coupling relationship with said modifier core.

9. A mode field modifier for use with a single-mode optical fiber having a core and a cladding of outside diameter d, said modifier comprising a modifier core having a refractive index $n_1$, a first cladding layer surrounding said modifier core, said first cladding layer having a refractive index $n_2$ that is less than $n_1$, a second cladding layer on the surface of said first cladding layer, the refractive index $n_3$ of said second cladding layer being less than $n_2$, said modifier being tapered intermediate its ends whereby it has a large diameter end and a small diameter end, the diameters of at least said core and said first cladding layer at said large diameter end being greater than the corresponding diameters at said small diameter end, the diameters of said core and first cladding layer at said small diameter end being sufficiently small that the field of a single-mode signal propagating in said core and first cladding layer at said large diameter end of said coupler toward the small diameter end thereof is no longer confined to said core and first cladding but it spreads and is effectively guided by the waveguide consisting of said first and second claddings, the diameter $D_1$ of said first cladding layer at said large diameter end being greater than d, whereby an enhanced enlargement of the mode field diameter of said single-mode signal is obtained, and means for positioning a fiber at said large diameter end in light coupling relationship with said modifier core.

* * * * *